United States Patent
Ohmes et al.

(10) Patent No.: US 6,264,457 B1
(45) Date of Patent: Jul. 24, 2001

(54) SERVO INFEED SYSTEM FOR TRANSFERRING PREFORMS IN A CONTAINER MANUFACTURING FACILITY

(75) Inventors: Joseph G. Ohmes, Independence, MO (US); Edward J. Strand, Douglasville, GA (US)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 0 days.

(21) Appl. No.: 09/518,336

(22) Filed: Mar. 3, 2000

(51) Int. Cl.[7] .......................... B29C 31/08; B29C 49/42
(52) U.S. Cl. ............... 425/145; 29/407.09; 198/481.1; 198/571; 198/576; 264/538; 425/534
(58) Field of Search ..................... 264/538; 425/534, 425/145, 171; 29/407.09, 407.01, 428; 198/571, 576, 480.1, 481.1

(56) References Cited

U.S. PATENT DOCUMENTS

| | | | |
|---|---|---|---|
| 4,299,549 | * 11/1981 | Suzuki et al. | 425/534 |
| 4,313,720 | * 2/1982 | Spurr | 425/534 |
| 4,355,968 | * 10/1982 | Lagoutte et al. | 425/526 |
| 4,479,772 | * 10/1984 | Kleimenhagen | 425/534 |
| 4,790,741 | * 12/1988 | Takakusaki et al. | 425/534 |
| 5,110,282 | * 5/1992 | Voss | 425/534 |
| 5,116,217 | * 5/1992 | Doudemont et al. | 425/534 |
| 5,509,796 | * 4/1996 | Di Settembrini | 425/534 |
| 5,683,729 | * 11/1997 | Valles | 425/534 |
| 5,853,775 | * 12/1998 | Oas et al. | 425/145 |

* cited by examiner

*Primary Examiner*—Robert Davis
(74) *Attorney, Agent, or Firm*—Knoble & Yoshida, LLC

(57) ABSTRACT

A system for transferring preforms to an oven starwheel of a blowmolding manufacturing facility includes a transport mechanism that is constructed and arranged to be able to hold at least one plastic preform member, a first sensor for sensing a transport speed of the oven starwheel, and a controller for controlling movement of the transport mechanism. The controller receives input from the first sensor so that it may instruct the transport mechanism to transport a preform to the oven starwheel at a speed that will closely match the speed of the oven starwheel. The controller is also programmed to instruct the transport mechanism to receive preforms from a supply of preforms at a speed that is less than the speed of the oven starwheel. This reduces the potential for jamming at the interface between the preform supply and the transport mechanism.

13 Claims, 1 Drawing Sheet

SERVO INFEED SYSTEM FOR TRANSFERRING PREFORMS IN A CONTAINER MANUFACTURING FACILITY

BACKGROUND OF THE INVENTION

1. Field of the Invention

This invention relates to systems and processes that are used to manufacture hollow containers such as plastic beverage bottles from preforms. More specifically, this invention relates to an improved process and apparatus for transferring preforms within such a system to an oven or other system component.

2. Description of the Related Technology

Conventional systems for blowmolding preforms in a facility for manufacturing, for example, PET bottles generally include at least one preform heat treating station in which the preforms are heated to a temperature at which they can be reshaped, a station or subsystem for transferring the preforms to the heat treatment station, and a blowmolding station for molding the preforms into the shape of a mold that corresponds to the outer shape of the container that is to be produced.

Typically, the station or subsystem for transferring the preforms to the heat treatment station includes an oven starwheel that is designed to grip the individual preforms in pockets that are disposed about its periphery and transport the preforms in a circular path that corresponds to the circumference of the star wheel. Such conventional systems may also include a preform feed wheel that is positioned to pick the preforms out of a linear array and feed the preforms into the star wheel. The feed wheel and starwheel in such systems are synchronized for common movement by means of a chain or belt linkage, or by continuously engaged gearing. While such systems are generally effective, they tend to be expensive because of the cost of providing and maintaining the mechanical connection between the star wheel and the feed wheel, and also tend to be susceptible to jamming, particularly at the input end of the feed wheel, where the feed wheel is designed to receive the individual preforms from the linear array while continuously rotating.

It may be concluded, then, that there is a need for an improved system and process for transferring preforms to a heat treatment station in a blowmolding manufacturing facility that is less expensive to deploy and maintain than conventional systems, and that is also less susceptible to mechanical malfunction.

SUMMARY OF THE INVENTION

Accordingly, it is an object of the invention to provide an improved system and process for transferring preforms to a heat treatment station in a blowmolding manufacturing facility that is less expensive to deploy and maintain than conventional systems, and that is less susceptible to mechanical malfunction.

In order to achieve the above and other objects of the invention, a system for transferring preforms to an oven starwheel of a blowmolding manufacturing facility includes, according to a first aspect of the invention, a transport mechanism that is constructed and arranged to be able to hold at least one plastic preform member; first sensor for sensing a transport speed of an oven starwheel in a blowmolding manufacturing facility; and a controller for controlling movement of the transport mechanism, the controller means being provided input from the first sensing means, whereby the controller means may instruct the transport mechanism to transport a preform to the oven starwheel at a speed that will closely match the speed of the oven starwheel.

According to a second aspect of the invention, a method of retrofitting an oven starwheel of a blowmolding manufacturing facility with an automated feed system includes steps of installing a first sensor for sensing a transport speed of an oven starwheel in a blowmolding manufacturing facility; installing a transport mechanism that is constructed and arranged to be able to hold at least one plastic preform member; installing a controller for controlling movement of the transport mechanism, the controller being connected so as to be able to receive input from the first sensor; and testing the system.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
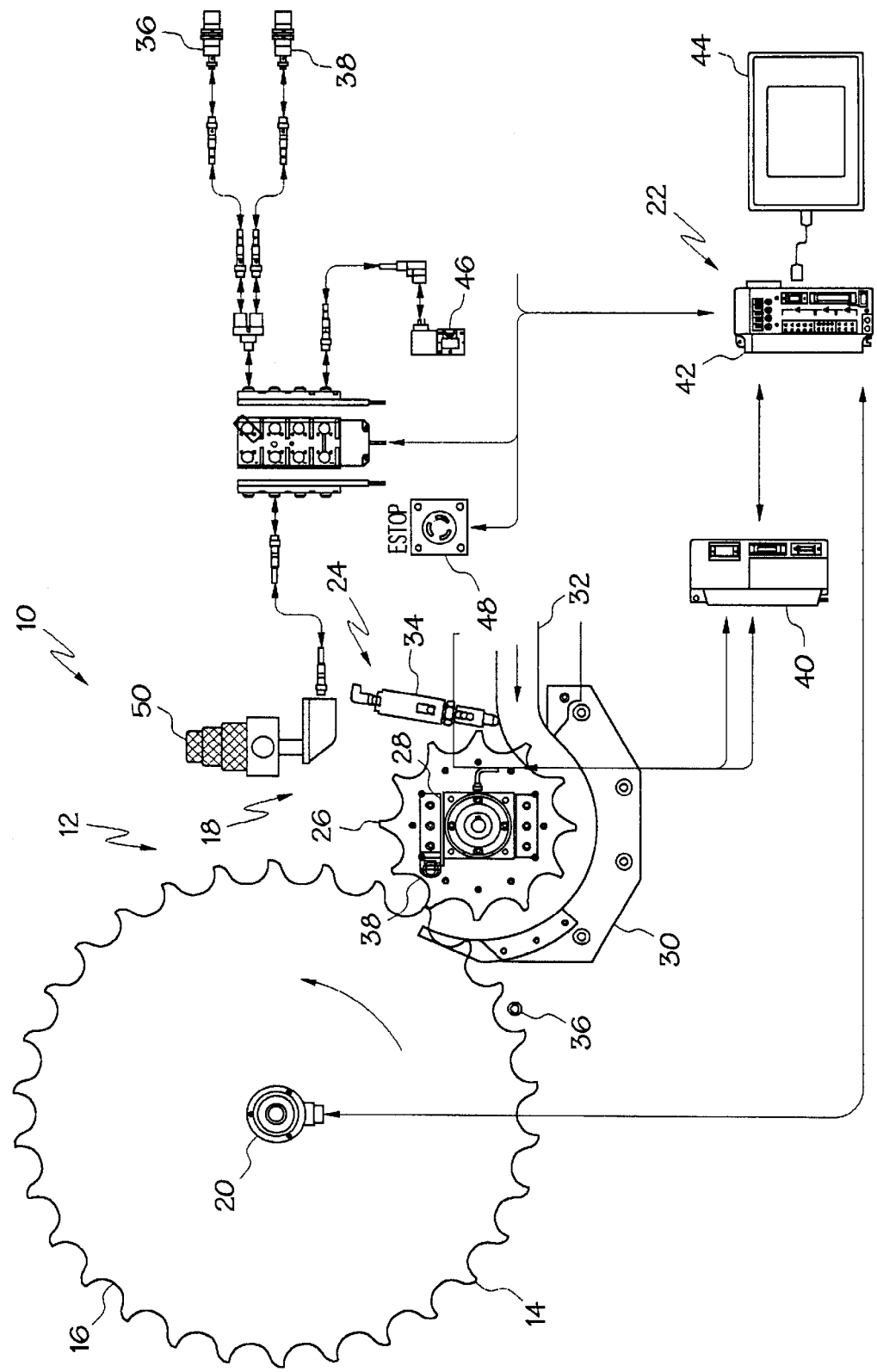
FIG. 1 is a diagrammatical view depicting a system that is constructed according to a preferred embodiment of the invention.

Referring now to the drawings, wherein like reference numerals designate corresponding structure, and referring in particular to FIG. 1, a system 10 for transferring preforms to an oven starwheel 14 of a blowmolding manufacturing facility according to the preferred embodiment of the invention includes a transport mechanism 18 that is constructed and arranged to be able to hold at least one plastic preform member. The oven starwheel 14 is likewise constructed to be able to hold and transport plastic preform members and is provided with pockets 16 for this purpose that are of conventional construction.

As may be seen in FIG. 1, the system 10 includes a first sensor 20 for sensing the transport speed of the oven starwheel 14. In the preferred embodiment, sensor 20 is an encoder that tracks position of the oven starwheel 14. System 10 further includes a controller 22 that in the preferred embodiment is a programmable logic controller. The purpose of controller 22 is to control movement of the transport mechanism 18. To that end, controller 22 is configured to receive input from the first sensor 20, so the controller 22 may instruct the transport mechanism 18 to transport a preform to the oven starwheel 14 at a speed that will closely match the speed of the oven starwheel 14.

System 10 further includes a preform release system 24 that is responsive to instruction from the controller 22 and that, in the preferred embodiment, includes a pair of guide rails 32 that organizes the preforms into a continuous linear array and a gate system 34. Gate system 34 is retractable by means of a pneumatic cylinder to permit individual preforms to be pressure or gravity fed into the transport mechanism 18. The pneumatic cylinder is controlled by a valve 46 that is responsive to instruction from the controller 22, as is shown schematically in FIG. 1. The transport mechanism 18, as may be seen in FIG. 1, is preferably embodied as a feed wheel 26 that, like starwheel 14, includes a number of discrete pockets that are of conventional construction for holding individual preforms. Feed wheel 26 is driven by a servo motor 28 that is controlled by the controller 22. The servo motor 28 also includes a rotational position sensor that provides input to the controller 22. In addition to the rotational speed sensors that are described above with respect to oven starwheel 14 and infeed wheel 26, proximity sensors 36, 38 are also provided, respectively, for the oven starwheel 14 and the infeed wheel 26 for providing the controller 22 with an orientation as to the minute positioning of the starwheel 14 and infeed wheel 26. In other words, the sensors 36, 38 provide controller 22 with precise information regarding the positional displacement of the individual pockets 16 on the wheel 14, 26.

The controller 22 includes a servo amplifier 40, a programmable logic controller 42 and an operator interface that includes a touchscreen control panel 44. Also provided in association with the controller 22 is an emergency stop switch 48 and an audible alarm and beacon 50. The touchscreen operator interface panel 44 permits an operator to adjust such aspects of system operation as: on the fly advancing and retarding of the infeed wheel 26 with respect to the oven starwheel 14, the ideal load position of the infeed wheel 26 with respect to the feed array 32, settings as to when a stop signal that may be received from an overall system control will be processed, positional error settings that relate to how far the servo mechanism is permitted to be out of synchronization before shutting down, torque limits that are permitted to be endured by the servo motor, and gives the system 10 an infinitely adjustable electronic clutch.

According to one important aspect of the invention, the controller 22 is programmed to instruct the transport mechanism 18 to receive preforms from the feed array 32 at a speed that is less than the transport speed of the oven starwheel 14, thereby reducing the potential for jamming at the interface between the feed array and the infeed wheel 26. In the preferred embodiment, the controller 22 is programmed to instruct the transport mechanism 18 to receive preforms from a stationary position, which reduces the potential for jamming to be almost nil.

In operation, the system will be powered up, and the controller 22 will determine the reference positions of the oven starwheel 14 and the infeed wheel 26 by information that is received from the minute positional displacement sensors 36, 38. The controller 22 will then instruct the transport mechanism 18 to assume the ideal load position. At this point, depending upon the presence or absence of a compatible overall system controller, the controller 22 may wait for a go-ahead signal from the overall system controller or molding machine. When such a signal is received, the controller 22 will instruct the valve 46 to cause the preform feed cylinder 34 to retract, thereby permitting a preform to enter into a corresponding pocket on the infeed wheel 26. This transfer is, in the preferred embodiment, effected while the infeed wheel 26 is stationary, which allows for a certain and stable transfer of the preform. The controller 22 will continue to execute this process, permitting the infeed wheel 26 to be filled with preforms, which will eventually be transferred, under the direction of the controller 22, to the oven starwheel 14. The motion of the infeed wheel 26 will be controlled by controller 22 in response to the sensed rotational motion of the oven starwheel 14, based on the input that is provided by the first sensor 20. If, during operation of this process, problems are detected, the controller 22 may automatically shut the process down, or notify the operator or other attendants by actuating the alarm and beacon 50.

Another aspect of the invention is a process for retrofitting existing oven infeed systems in a container manufacturing facility so as to incorporate the system that is described above. In the preferred embodiment, this aspect of the invention is performed by first removing any preexisting infeed systems, such as the systems described above that utilize a fixed mechanical connection between the oven starwheel and the infeed mechanism. After any pre-existing infeed systems have been removed, the first sensor 20 or encoder is installed on the oven starwheel assembly. Any modifications that are necessary to the preform infeed area, such as providing or modifying the hardware that guides the linear feed array to the transport mechanism 18, are then made. At this point, the electronic hardware, including the servo amplifier 40, the programmable logic controller 42, the touch screen operator interface assembly 44, and the preform release mechanism 24 and its associated hardware 46 are then installed. The transport mechanism 18 is at this point installed and positioned so as to be in the proper orientation with respect to the oven starwheel 14 and the preform release mechanism 24. The minute positional displacement sensors 36, 38 are installed and are electronically connected to the controller 22. The entire system is at this point powered up and tested.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for transferring preforms to an oven starwheel of a blowmolding manufacturing facility, comprising:
    a transport mechanism that is constructed and arranged to be able to hold at least one plastic preform member;
    first sensing means for sensing a transport speed of an oven starwheel in a blowmolding manufacturing facility; and
    controller means for controlling movement of said transport mechanism, said controller means being provided input from said first sensing means, whereby said controller means may instruct the transport mechanism to transport a preform to the oven starwheel at a speed that will closely match the speed of the oven starwheel.

2. A system according to claim 1, further comprising preform release means for releasing a preform member from a supply of such members to the transport mechanism, said preform release means being responsive to instruction from said controller means.

3. A system according to claim 2, wherein said controller is constructed and arranged to instruct the transport mechanism to receive preforms from said supply at a speed that is less than the transport speed of the oven starwheel, thereby reducing a potential for jamming.

4. A system according to claim 1, wherein said transport mechanism comprises a feed wheel.

5. A system according to claim 4, further comprising a servo motor for driving said feed wheel, said servo motor being responsive to instruction from said controller means.

6. A system according to claim 1, wherein said controller means comprises a programmable logic controller.

7. A system according to claim 2, wherein said preform release means comprises a fluid cylinder.

8. A method of retrofitting an oven starwheel of a blowmolding manufacturing facility with an automated feed system, comprising steps of:

(a) installing a first sensor for sensing a transport speed of an oven starwheel in a blowmolding manufacturing facility;

(b) installing a transport mechanism that is constructed and arranged to be able to hold at least one plastic preform member;

(c) installing a controller for controlling movement of the transport mechanism, the controller being connected so as to be able to receive input from the first sensor; and (d) testing the system.

9. A method according to claim 8, further comprising a step of installing a preform release means for releasing a preform member from a supply of such members to the transport mechanism, said preform release means being connected to receive instruction from said controller means.

10. A method according to claim 9, further comprising a step of programming the controller to instruct the transport mechanism to receive preforms from said supply at a speed that is less than the transport speed of the oven starwheel, thereby reducing a potential for jamming.

11. A method according to claim 8, wherein step (b) is performed with a transport mechanism that comprises a feed wheel.

12. A method according to claim 11, wherein step (b) is further performed by installing a servo motor for driving said feed wheel, said servo motor connected so as to receive instruction from said controller.

13. A method according to claim 8, wherein said controller comprises a programmable logic controller.

* * * * *